United States Patent
Tiernan

[11] Patent Number: 5,947,372
[45] Date of Patent: *Sep. 7, 1999

[54] COMBINED FUEL LEVEL MONITOR AND THERMOSTAT

[76] Inventor: Teresa Conaty Tiernan, 32 Gainer Ave., Centredale, R.I. 02911

[*] Notice: This patent issued on a continued prosecution application filed under 37 CFR 1.53(d), and is subject to the twenty year patent term provisions of 35 U.S.C. 154(a)(2).

[21] Appl. No.: 08/740,782

[22] Filed: Nov. 1, 1996

[51] Int. Cl.[6] ............................. G05D 23/00; G01F 23/00
[52] U.S. Cl. ............................. 236/94; 73/292; 116/227; 165/DIG. 5
[58] Field of Search ..................... 236/94 F; 73/292; 116/227; 137/412; 165/DIG. 5

[56] References Cited

U.S. PATENT DOCUMENTS

| | | | |
|---|---|---|---|
| 2,048,653 | 7/1936 | Taylor | 236/94 X |
| 3,120,125 | 2/1964 | Vasel | 116/227 X |
| 3,431,779 | 3/1969 | Wilken et al. | 73/292.2 X |
| 4,459,584 | 7/1984 | Clarkson | 73/321 X |
| 4,480,610 | 11/1984 | Stinson | 73/302 X |
| 4,523,460 | 6/1985 | Strickler et al. | 73/200 |
| 4,524,617 | 6/1985 | Krehel et al. | 73/296 |
| 4,528,635 | 7/1985 | Juodikis et al. | 73/61.3 X |
| 4,682,648 | 7/1987 | Fried | 236/51 |
| 4,736,329 | 4/1988 | Ferretti et al. | 73/291 X |
| 4,788,648 | 11/1988 | Ferretti et al. | 73/291 X |
| 4,805,453 | 2/1989 | Haynes | 73/292 |
| 4,865,073 | 9/1989 | Kocher | 137/558 X |
| 5,005,407 | 4/1991 | Koon | 73/290 R |
| 5,189,911 | 3/1993 | Ray et al. | 73/292 |
| 5,230,563 | 7/1993 | Shalvi | 73/292 X |
| 5,245,873 | 9/1993 | Fathauer et al. | 73/304 C |
| 5,253,521 | 10/1993 | Abramovich et al. | 73/206 |
| 5,323,652 | 6/1994 | Parker | 73/295 |
| 5,469,749 | 11/1995 | Shimada et al. | 73/861.47 |

OTHER PUBLICATIONS

Centroid Prods. "Computank" brochure, Sep. 18, 1996 rev Oct. 4, 1996 Edgewater, Florida.
Hunter Fan Co., Memphis, TN "Programmable Thermostats" brochure © 1993.
Honeywell, Golden Valley, MN "Honeywell Programmable Thermoststs" brochure, © 1992.
Headhunter, Inc. (Ft. Lauderdale, FL) *Tank Sentry* fluid level monitor brochure.
NMMA (Ft. Lauderdale, FL) "Wema–System™" marine level and temperature gauges.
"NY Oil Marketer Uses Home Monitoring Device to Attract New Business, Increase Drops," *Yankee Oilman*, p. 50.
"Scul–Tel" system brochure from Scully Signal Co., Wilmington, MA (1992).
"Scul–Tel" system brochure from Scully Signal Co., Wilmington, MA (1993).

*Primary Examiner*—William Wayner
*Attorney, Agent, or Firm*—Hopgood, Calimafde, Kalil, & Judlowe

[57] ABSTRACT

The present invention is directed to a combination of a thermostat, especially for controlling the heating of a dwelling, and a level indicator for displaying the level of liquid fuel (such as home heating oil) in a storage tank that is burned for heating the dwelling and that is controlled by the thermostat. The invention is especially useful for the elderly or infirm in a wheel chair who may not be able physically to view the level indicator at the fuel tank if it is down at the bottom of the cellar stairs. In addition to a level display at the dwelling thermostat, the level indication can be accessed remotely (such as via modem and personal computer).

18 Claims, 2 Drawing Sheets

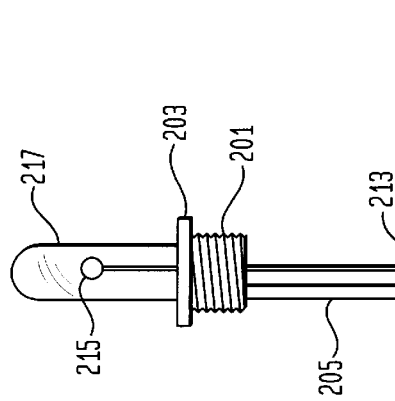
FIG. 2
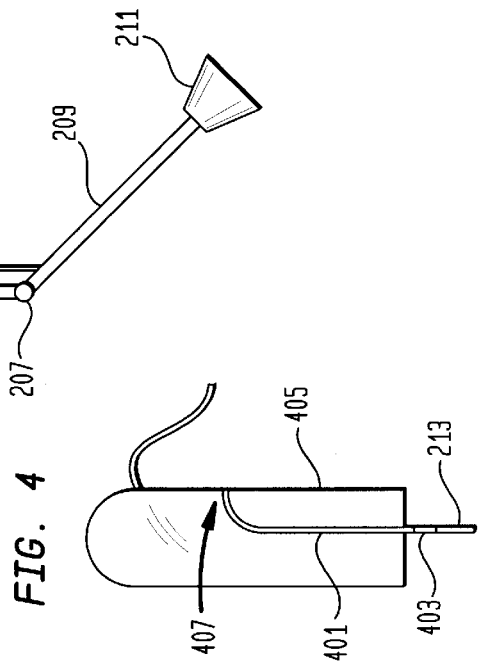
FIG. 4
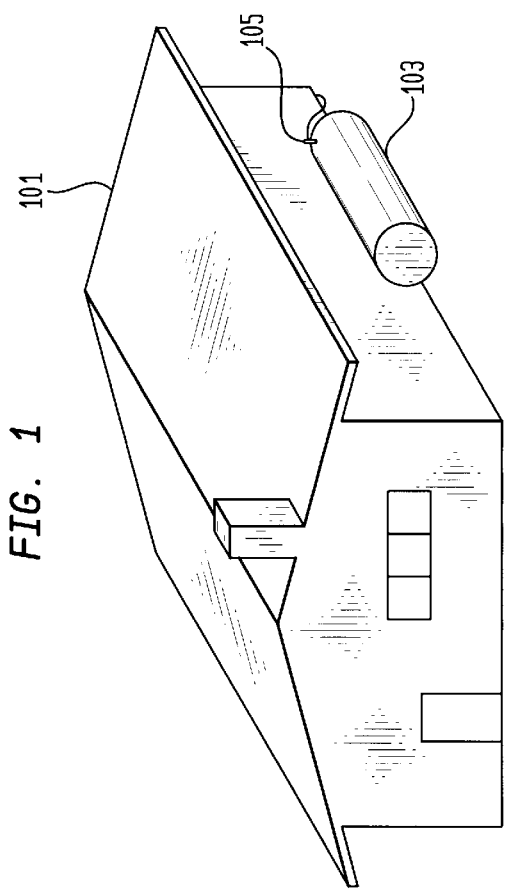
FIG. 1
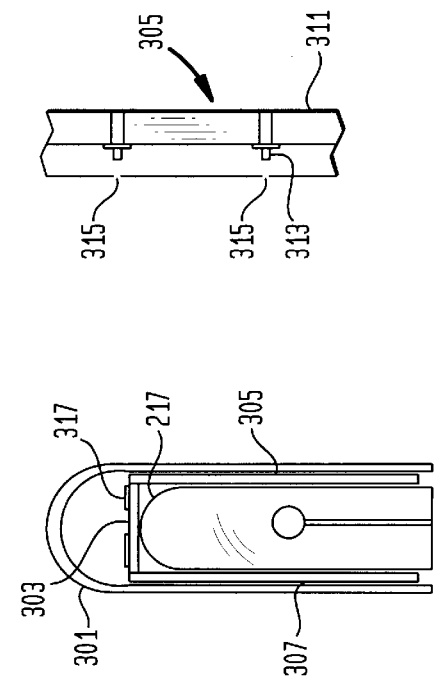
FIG. 3B
FIG. 3A

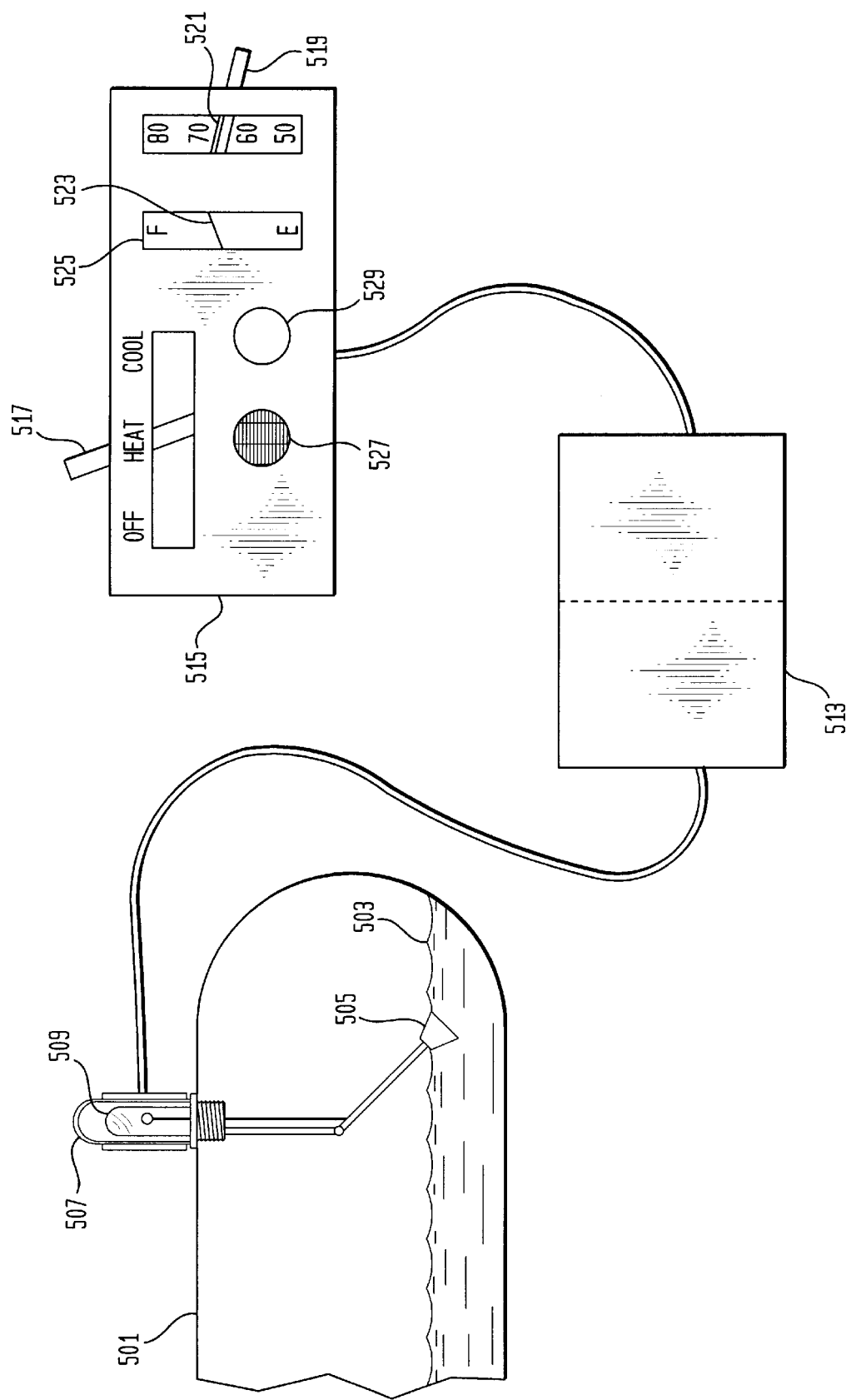

COMBINED FUEL LEVEL MONITOR AND THERMOSTAT

BACKGROUND OF THE INVENTION

1. Field of the Invention

The present invention relates to a system for monitoring of the level of fuel for a dwelling's heating unit wherein the level is displayed remotely at a thermostat in the dwelling.

2. The State of the Art

Dwelling units typically are heated using as energy sources one or more of gas, oil, or electricity. Energy sources with fuel stored locally at the dwelling include oil and other liquid fuels (e.g., propane); natural gas and electricity are typically available from a distributed system and so are not stored locally at the dwelling unit.

Especially in the Northeast United States, a significant number of homes are heated with oil. The oil is generally stored in a tank adjacent to the dwelling unit, and a pump associated with the tank pumps the oil to a heating unit within the dwelling. The occupant of the dwelling, or an oil delivery service, periodically must check the oil level in the tank and, if necessary, order more oil from an oil delivery service if the tank is running low. In domestic oil tanks, the level is typically measured using either a dipstick or a simple flotation device (described below and generally shown in FIG. 2).

There are quite a number of patented and commercialized devices for determining, sometimes remotely, the level of liquid in a tank, some of which are now described. Krehel et al. (U.S. Pat. No. 4,524,617) describe a fuel gauge for a propane tank, such as used with a portable gas grill for cooking, comprising a scale that weighs the tank and thereby estimates the amount of fuel remaining therein. Parker (U.S. Pat. No. 5,323,652) describes a level indicator comprising a thermochromic strip that senses and displays (through a thermochromic material) the temperature difference on the outside of the tank resulting from the cooling effect of liquid propane adjacent the strip. Koon (U.S. Pat. No. 5,005,407) describes a level indicator for a tank including a sensing strip attached to a power source to cause the strip to generate an electrostatic filed that changes proportionally to the level in the tank; the sensed level can be displayed remotely. Stinson (U.S. Pat. No. 4,480,610) describes a remote oil level indicator, especially for sensing a low level in a fuel tank for an internal combustion engine (e.g., for an automobile) by sensing the pressure change in a closed tubular conduit disposed in the tank below the fuel level line. Clarkson (U.S. Pat. No. 4,459,584) discloses an automatic liquid level indicator and alarm system utilizing a float connected to a line having magnets thereon and the position of the magnets is sensed to determine the level of liquid in the tank. The disclosures of all of these patents are incorporated herein by reference. Various other level indicators and switching devices are manufactured and/or sold by such entities as IMO Industries, Inc. (Gem Sensors Div., Plainville, Conn.), Advanced Control Technology, Inc. (Bloomington, Minn.), KIP Incorporated (Farmington, Conn.), and Madison Co. (Branford, Conn.); radar level gauges (available from Endress+Hauser, Greenwood, Ind.), akin to sensors for focussing automatic cameras, are also suitable. Various thermostat manufacturers including Honeywell Corp. (Home and Building Control Div., Golden Valley, Minn.), Hunter Fan Co. (Memphis, Tenn.), Emerson Elec. Co. (White Rogers Div., St. Louis, Mo.), and Robertshaw Control Co. (Long Beach, Calif.).

The unappreciated problem yet to be addressed by any of these patents and manufacturing/sales entities is an easy way to remotely sense the level of fuel in the tank and to display that information in a useful and convenient manner to the occupant of the dwelling. At present, as noted above, the occupant (or the oil delivery service) must periodically monitor the oil level in the tank to assure a timely order for more fuel oil and avoid freezing the pipes. For the elderly, and in bad weather, it may be very difficult to ascertain the level of fuel in the tank, so that the possibility of running out of heating fuel becomes a real possibility. When the fuel tank is outside or in a basement, a disabled or handicapped individual (e.g., one requiring crutches or a wheelchair, or otherwise unable to traverse stairs) may not physically be able to check the level of the fuel tank, thus requiring reliance on another person to periodically check the tank level.

OBJECTS AND SUMMARY OF THE INVENTION

In view of the foregoing, it is an object of this invention to provide a remote sensing thermostat unit that controls the heating unit and also displays the level in the fuel storage tank.

Another object of the invention is to provide such a remote sensing and display unit that is relatively inexpensive and/or is easy to install, especially where the dwelling owner can install the device without professional assistance.

Yet another object of the invention is to provide such a remote sensing and display unit that provides an alarm to the dwelling occupants if a low level condition exists.

Still another object of the invention is to provide such a remote sensing unit that functions in the absence of electricity, either from the general power company's grid or locally, in the event of an electric power failure.

Yet still another object of this invention is to provide a system that can be implemented easily by retrofitting an existing system, and especially without modifying the storage tank.

These and other object will become apparent upon a perusal of this specification and the appended claims.

In summary, in one embodiment the invention comprises a system for heating a dwelling unit that comprises (a) a fuel storage tank, (b) a sensing device for measuring the level of fuel in the tank and for transmitting a signal indicative of said level, and (c) a remote display device comprising (i) a thermostat for controlling a heating unit for heating the dwelling, said heating unit operating on the fuel in said storage tank, and (ii) a device for receiving the transmitted signal and displaying said signal to indicate the level of fuel in the tank.

In various other embodiments, the system can be used with any liquid or liquified heating composition stored in a tank. The system can be provided with an alarm that indicates a low level condition in the tank; the alarm can be audio and/or visual, and/or can be sent and received remotely (such as via telephone lines) to an oil service supply company (who is then notified that the tank needs to be filled). The system can also be embodied in a home/personal computer that can remotely check the thermostat settings and readings (temperature and tank level).

BRIEF DESCRIPTION OF THE FIGURES

FIG. 1 depicts an idealized perspective view of an example of a dwelling with an oil storage tank.

FIG. 2 depicts a side view of a commonly used float level indicator for oil storage tanks.

FIGS. 3A and 4 depict idealized side views of embodiments of the present invention for sensing the fuel level in the storage tank; and FIG. 3B depicts an idealized detailed view of a portion of the sensing apparatus shown in FIG. 3A.

FIG. 5 depicts one embodiment of a system according to the present invention.

DETAILED DESCRIPTION OF SPECIFIC EMBODIMENTS

The present invention is generally directed to a combined thermostat and fuel level display for a dwelling unit. As shown in FIG. 1, the dwelling unit 101 typically includes a fuel storage tank 103 adjacent the unit or set off some small distance from the dwelling. The oil (or other liquid fuel) from the tank is pumped (not shown) to the heating unit (not shown) that is typically in the basement or a back room of the dwelling. The level of liquid fuel in the tank can be measured with a dipstick or with a simple float device.

An example of a commonly used flotation device is shown in FIG. 2 and generally cost less than twenty dollars. The device generally includes a threaded neck 201 for threading into an associated opening in the top of the storage tank (not shown) and a flange 203 at the top of the neck. Attached to and depending from the neck structure is a depending arm 205 that extends into the tank. At the end of the arm opposite from the neck is a pivot 207 or hinge to which a lower arm 209 is pivotally attached. At the end of the lower arm opposite from that attached to the pivot is a float 211, generally a cork. In operation, with the neck portion fixed to the tank, changes in the level will cause the float to move up or down. A sensing rod 213 is attached to the lower arm and has attached to its opposite portion a display target 215, enclosed in a protective, typically transparent or translucent, cover 217. As the level changes, the cork level changes and, as the cork moves, the lower arm rotates about the pivot and forces the sensing rod, and the attached display target, also to move in the same direction as the level; the amount by which the display target moves with respect to the float depends upon the distance from the pivot at which the sensing rod is attached to the lower arm.

Although other, more sophisticated and/or expensive level sensors can be used in practicing the present invention, this simple type of device is preferable because it is inexpensive, widely available, and can be installed in many storage tanks without modification of the tank or the float device.

Continuing with the description of the invention used with the typical level monitoring float shown in FIG. 2, one embodiment of the level sensing and transmitting part of the present invention is shown in FIG. 3A. As shown therein, a housing 301 is provided in a geometry cooperating with the geometry of the protective cover of the float device to effectively enclose the display target 215 therein and to protect the sensing device from the elements (if located outside). The display target is typically a white-colored ball or disk affixed atop the end of the sensing rod. In the absence of this invention, the dwelling owner would have to venture outside and visually observe the position of the display target within the protective cover to estimate the amount of oil remaining the tank. (As alluded to, this invention is being described in the environment of an oil fuel storage tank; yet it should be understood that the invention is applicable to any liquid fuel stored for heating a dwelling (i.e., a structure occupied by people, animals, and or plants, generally living things, regardless of whether the people therein are residing or working). With the present invention, the sensing housing 301 is disposed over the protective cover 217 of the float and the position of the display target 215 can be determined by various means. In the embodiment shown in FIG. 3, the position sensing device 303 associated with the housing includes a harness or frame that contains a series of photoelectric sensors 305 of types well known in the art, which can use white light or laser light (e.g., an LED emitting IR); disposed orthogonally across the protective cover. The position sensing device contains one or a series of light generating devices 307 that transmit light across and through the protective cover to the photoelectric sensors on the other side. The essential criterion is that the display target should be of a size sufficient to block the transmission of light through the cover. The level of oil in the tank will determine the height of the display target, and the relative vertical position of the display target will block light from a particular light generating device from reaching an associate sensor on the other side of the cover. It is then a simple matter to determine, from the verticalmost photoelectric sensor that is not activated (i.e., the light is blocked) the approximate height of the fuel level.

FIG. 3B depicts a more detailed view of an embodiment of the light generating device 305 shown in FIG. 3A. Preferably the structures for the light generating devices and the photoelectric sensors are comprised of a flex circuit (e.g., a printed circuit board on a flexible substrate). As such, depicted in FIG. 3B are a substrate 309 or other preferably flexible frame onto which a wiring circuit 311 is integrated on the outer side. The inner side that will be facing the protective cover has mounted thereon the series of light generating devices 313 (such as an series of LEDs). These devices are disposed behind a wall having a series of apertures 315 through which light from the light generating devices passes and is focussed into a narrow beam for reception by a corresponding photoelectric sensor. Preferably atop the device, within the protective housing, are one or more integrated circuit chips 317 (e.g., ASIC chips) for performing the control logic, such as cycling on and off the light generating devices and/or converting the signals from the photoelectric cells into a signal for transmission to the thermostat.

It is perhaps important to note, consistent with the intent of the invention to provide a simple and inexpensive system, that the exact level of fuel is not a particular concern. That is, it is generally sufficient to know at least when there is a level of about 10%–30% (of the total level) in order to timely order more oil. Accordingly, it is preferred to have at least two sensors (e.g., at 10% and 25% level), and perhaps not more than about four sensors (e.g., at 10%, 20%, 30%, and 40% level) in order to minimize the cost of manufacture (fewer sensors means less capital spent on sensors and less labor to install, wire, and test those sensors in each device manufactured).

The light generating devices and the photoelectric sensors can be powered by the domestic electric supply (typically 115 v AC). More preferably, oil tanks typically have an associated oil pump that operates on 24 v DC. This DC power source for the pump can also be used to power these same components in the present device. Additionally, for tanks stored in a basement in which the oil burner is located, there is a 24 v DC (or other power) source for the ignition of the oil burners; this source of power can also be routed to the sensor of the present invention. It is preferred that the duty cycle of the light generating devices be kept to a minimum, especially when the present invention is powered locally by a battery, to minimize power consumption. For an outdoor, above ground tank, a solar cell can be provided to recharge the battery. Various jurisdictions, such as portions of Connecticut, now require fuel storage tanks to be housed in the interior of the dwelling, such as in the basement, to minimize environmental damage cause by release (such as leaking) of the toxic oil.

In another embodiment of the invention, depicted in FIG. 4, the display target at the top of the sensing rod, as well as the rod itself, have been modified so that the upper part of the sensing rod 401 is electrically isolated from the main rod 213 by an insulating material 403 (at least electrically insulating). The inside surface of the cover is provided as a support to an electrically resistive surface 405 against which the tip 407 of the sensing rod rides vertically. A voltage source (not shown, but it can likewise be 115 v AC or 24 v DC, or a small battery such as a 9 v) is connected between the upper part of the sensing rod and one of the ends of the resistive surface, and the amount of current passing through the rod and the resistive surface to complete a circuit provides a measure of the total resistance, and thus the vertical position along the resistive surface where the tip of the rod contacts. This embodiment, although operative, is not preferred because of the potential for an electric spark, which could ignite fumes in the tank. Accordingly, it would be preferable to provide a vapor seal to isolate the area displayed under the protective cover from the fumes in the tank, which seal must also provide for the translation of mechanical motion from the sensing rod to the display target.

The level sensing can also be performed non-electrically, such as the pneumatic system disclosed by Stinson in U.S. Pat. No. 4,480,610, described above. As another embodiment, the upper portion of the sensing can be attached to a wheel fixed onto a shaft, and the angular movement of the wheel (analogous to the vertical motion of the target), can be measured and transmitted as indicative of the level of fuel in the tank.

However the liquid level is measured, the signal is preferably transduced into an electrical signal indicative of the level of fuel in the tank. With an embodiment of the invention as shown in FIGS. 3A and 3B, preferably the chip is programmed to perform simple logic to provide a signal indicative of the level of liquid fuel in the tank; as noted above, the sensing apparatus can be provided on a flex circuit so that the light generating device, photoelectric cells, and chips are operably associated with each other. The signal indicative of the level can be analog or digital. One method is using pulse code modulation (or pulse width modulation); for example, with four sensors and LEDs, if the duty cycle for sending a signal is 100 ms (0.1 s), each 25 ms can be representative of one of the level sensors, so that a pulse width of 50 ms indicates that two of the four sensors are occluded, and a pulse width of 100 ms indicates that the none of the four sensors are occluded. Alternatively, the sensor outputs can be fed to a comparator and the output inverted so that a pulse width of 100 ms indicates that all four of the sensors are occluded. Other devices for sensing the mechanical position of the target include differential transformers, inductance bridges, bellows, pneumatic amplifiers and pilot relays, an electronic force balance. See generally, e.g., *Chemical Engineers'Handbook*, 5th Ed. (New York: McGraw-Hill Book Co., 1973), Chpt. 22 "Process Control." Yet another method includes providing a magnet for the target and replacing the light generating sources (and associated photocells) with magnetic switches; the relative position of the switch actuated by the position of the magnetic target effectively encodes the relative level of the tank.

Although not necessary to a certain extent, the present device should be calibrated with respect to the full movement of the target. That is, the sensors are preferably calibrated to accommodate the desired range of movement of the target, and the target is calibrated thereto to assure that the entire range of levels (or at least the entire lower range) can be displayed by the target and read by the sensors. Calibration depends, to some extent, on the type of sensors used and the logic associated with the sensor operation. For example, assuming that a magnetic target with magnet sensors is being used, calibration includes assuring that the bottommost sensor is activated when the target is at its lowest position when the tank is, in reality, empty. This type of calibration assures that the bottom range of the level determination is fully considered.

Depicted in FIG. 5 is an idealized view of an embodiment of the present system. The oil tank 501 has a level of liquid fuel 503 determined by a floatation device 505 the moves a target outside of the tank in a vertical direction within a protected chamber 507 surrounded by a device 509 for sensing and transmitting the vertical extent that the target moves within the chamber. The sensed signal is translated into an indication of the level range being measured to provide a level-indicating signal.

As suggested above, it is not necessary to cover the entire range of levels within the tank, especially when the intent is to provide warning that the tank is running low (rather than running high). The level-indicating signal can be transmitted as a pulsed code modulation or as an analog signal; for example, on a 5 v system (scaled so that 0 v is empty and 5 v is full) the logic can be designed so that 1 v is 20% level and 2 v is 40% level. The voltage range of the system can be scaled so that, for example, 5 v indicates 50% level and 1 v indicates 10% level. This choice is also dependent upon the logic, circuitry, and input requirements at the thermostat side, discussed just below. Desktop computer systems typically operate on about 5 v at about 20 ma, and portable (so-called laptop model) computers on slightly lower voltages. Accordingly, the present system is easily implemented using conventional components. The level-indicating signal can be electrical and sent along a wire, cable, or other metallic data transmitting structure 511 or can be converted into a light signal (such as infra-red) and transmitted optically along a fiber, or can be sent by radio frequency since the distance is likely to be rather small (probably less than 200 feet in a majority of instances). Further signal processing, including noise reduction, amplification, and/or scaling can be performed along the way in a given device 513 using well-known and existing technology. The level-indicating signal is eventually received by a receiving device associated with a thermostat 515, preferably disposed in the dwelling. Thermostat technology is well-known and is not discussed herein in detail. A thermostat face, as shown in FIG. 5, usually has a multiposition toggle switch 517 moveable between heating, cooling, and shutdown for setting the operating mode of the system (heating, cooling, off). Such a thermostat typically also has an variable position toggle 519 for setting the desired temperature setpoint. (A thermostat is essentially a controller: a temperature set point is selected, and if the error between the set point and the actual temperature differs by more than a predetermined amount and/or changes by more or less than a given amount or rate, then the system attempts to take action to adjust the sensed temperature.) Such devices typically also include an indication of the actual temperature, such as a needle 521 attached to a thermometer and having the typically same scale as used for the temperature set point toggle indicator.

(This facilitates measurement of the error from the set point since both the set point and the actual temperature are determined as vertical or arcuate movements along the same scale.) Using analog electrical signals, an electrical level-indicating signal transmission line includes two and preferably includes three wires. One wire is a signal ground, another is for data communication (voltage differences relative to the signal ground), and an optional third is a control line. The control line can be used to poll the level sensing device so that the device has a very low duty cycle. A fourth and fifth wire, for power and power ground, can also be used if there is no remote source of power or if such is not desirable. The data transmission rate can be designed depending upon the available power. For example, if only a battery is available, then a low power consumption can be used to drive a clock on the chip, and a level-indicating signal sent only during specified periods (e.g., every 15 minutes); a continuously available power source can offer higher transmission rates.

Thus, a signal indicative of the liquid fuel level can be sent as an encoded signal. Alternatively, the level signal can be modulated on existing lines in the dwelling. For example, using the existing thermostat control wires that lead to the oil burner, the level signal can be transduced to a bandwidth not used by those lines, transmitted thereon, and converted at the thermostat to a signal that can be displayed for the homeowner. The use of existing lines simplifies the installation of the device, avoiding the running of additional wires and/or associated conduits. Another, analogous alternative is to transduce the level signal into an RF signal that can easily be transmitted the relatively short distance to the thermostat (similar to home devices, such as Rabbit brand transmitters, for transmitting by radio frequency, a cable television signal from one location in a home to another). Still another alternative is to use the existing AC lines in the house, convert the level signal to a bandwidth not used in those AC lines and transmit the level signal on the AC lines or use the 60 Hz power cycle as a carrier frequency over which the level signal is modulated; such types of transmissions are presently done by devices that allow AC lines to be used to move telephone connections within a home (having an associated transmitter and receiver that each plugs into a convention AC socket) and, more recently, also used to send video signals over the AC lines.

In the present invention, the signal from the level measuring device is transduced into a display for the dwelling shown at the thermostat. The display can be in a variety of forms, such as an arcuately travelling needle as in a car's gas tank (or the temperature indicator 521 of the thermostat), it can be provided as a series of lights with indicia defining each light as a certain amount of fuel, or as an LCD display in percent, amount of fuel, or a simulation of an arcuate needle. The embodiment shown in FIG. 5 depicts a needle 523 moving arcuately in a display 525 having indicia showing the amount of fuel in the tank ("E" for empty, "F" for full). When the volume of the tank is known, and the float and the sensor apparatus of this invention have been calibrated, the level can be displayed as the number of gallons of fuel used and/or remaining, using simple arithmetic circuits, and a running count of gallons (or liters) of fuel used (or averaged as a daily and/or monthly and/or yearly value) can be calculated and displayed.

In further embodiments, the thermostat can include logic circuits to signal a visual alarm through a light 527 and/or an audio alarm through a speaker 529 for a low or low low alarm condition. Still further, the logic circuitry can be operably associated with a preprogrammed modem to automatically dial the oil supply company when the oil level reaches a certain minimum value.

In another embodiment, the system can be implemented or supplemented on a home/personal computer. Various of the above-mentioned manufacturers of thermostats also manufacture programmable thermostats. These devices include IC (integrated circuit) chips and a user-addressable touch pad for programming; typically, the programming capabilities are limited to setting different temperature set points for different times of the day (e.g., to raise the set point in the summer, and lower it in the winter when the dwelling is typically unoccupied during the normal business hours, and to reset the set point the desired setting later in the day when the resident arrives home). Presently there are some PC-computer driven systems that allow a resident remote access to program a thermostat (e.g., model RSU 10037760 remote thermostat controller and other devices sold by RadioShack, div. Tandy Corp., Ft. Worth, Tex., under the POWERHOUSE trademark) using conventional modem communications (modulation-demodulation along phone lines). According to the present invention, the level signal received by the thermostat for display at the indicator is stored in a memory device associated with the thermostat. Preferably, the thermostat also has a battery backup so that the information (regarding residential temperature and fuel level) is accurate even when domestic power is interrupted. The memory location storing the data related to the dwelling temperature and fuel level are accessible remotely via modem. Alternatively, the system can be designed to be activated by a touch tone phone, using a password, and a speech synthesizer (or canned phrases) to tell the caller the residence temperature and the fuel level (e.g., to the nearest 10% level, and especially if the level is in a low alarm condition). In this way, for example, a person having a home in New England can be on vacation in a southern state for much of the winter, and can check their fuel supply up North so that the fuel tank does not run empty while they are away. In such a situation, the dwelling temperature will be set rather low, but high enough to prevent water pipes from freezing or other types of cold damage to the dwelling, and so the system will be using fuel while the resident is away. With the present system, the vacationing resident will be assured that the heating system is still working, and a local oil or propane delivery company can be contacted if the fuel tank is running low.

The foregoing description is meant to be illustrative and not limiting. Various changes, modifications, and additions may become apparent to the skilled artisan upon a perusal of this specification, and such are meant to be within the scope and spirit of the invention as defined by the claims.

For example, while the invention as described has been directed to retrofitting an existing system, it is contemplated that a combined float and sensor can be manufactured for installation into new structures (and for tanks being replaced); as such, calibration is considered in the design of the device and need not be considered by the installer. Likewise, more sophisticated float/level sensors can be used, as well as various different data transmission encoding schemes and devices, and different methods of display. As described and claimed herein, the essence of the invention is the combination, in the same or essentially adjacent housings, of a thermostat and an indicator for the amount of fuel remaining that can be combusted under control of the thermostat.

Still further, large apartment complexes would benefit from the present invention. Although each unit might have a separate thermostat, the unit of a superintendent, or a unit manager's office, would have a thermostat as described herein and the level indicator would display the level of fuel available for the entire complex.

What is claimed is:

1. A combined system for controlling the heating of a dwelling, said heating provided by burning a liquid fuel stored in a tank, said combustion controlled by a thermostat in said dwelling, comprising:

a. a level sensing device comprising a plurality of sensors, each sensor for sensing an approximate level of fuel stored in said tank, one of said sensors indicative of a tank level that essentially full, another of said sensors being indicative of a tank level that is essentially empty, and the third indicative of a level between essentially full and essentially empty, and providing an output indicative of said levels measured by said plurality of sensing devices;

b. a transmitter for sending the output of the level sensing device as a level signal indicative of the level in the tank;

c. display means integral with said thermostat for receiving said level signal and displaying said level signal at said thermostat effective to provide at all times to a user observing the display an indication of the actual level of fuel in the tank.

2. The system of claim 1, wherein the display means is a needle gauge.

3. The system of claim 1, further comprising, integral with said thermostat, a system for providing an alarm wherein the alarm system indicates a low level condition of not more than a predetermined amount of the total fuel level remaining in the tank.

4. The system of claim 3, wherein the alarm system actuates a sound.

5. The system of claim 3, wherein the alarm system actuates a visual display.

6. The system of claim 3, further comprising a modem, and wherein the alarm system actuates said modem to connect with a specified telephone destination.

7. The system of claim 1, wherein said level sensing device includes a magnetic target, and said level signal transmitting device includes a plurality of magnetic switches.

8. The system of claim 1, wherein said level sensing device includes a target that is opaque to a particular light, and said level signal transmitting device includes a plurality of light generating devices and photoelectric sensing devices actuatable by occlusion of light generated by such devices by said opaque target.

9. The system of claim 1, wherein said level signal transmitting device further comprises an aperture for each of said light generating devices.

10. The system of claim 1, further comprising a battery power source associated with said level signal transmitting device.

11. The system of claim 1, wherein said transmitting device or said transmitting means further includes means for encoding the level signal.

12. The system of claim 11, wherein the level signal is digitally encoded.

13. The system of claim 1, wherein said transmitter includes a modulator for modulating the level sensor output onto an existing signal.

14. The system of claim 13, wherein said existing signal is a conventional AC power signal.

15. The system of claim 13, wherein said existing signal is a signal existing over thermostat control lines.

16. A method for (i) controlling the heating of a dwelling using liquid fuel stored in a tank that is combusted for heating a dwelling and (ii) displaying the fuel level in the tank, comprising:

A. storing the liquid fuel in a tank;

B. sensing using a plurality of sensors at least three levels of fuel in the tank, said three levels including one level indicative of an essentially full tank, another level indicative of an essentially empty tank, and a third level therebetween;

C. transmitting a signal indicative of the sensed level of fuel in the tank;

D. receiving said signal at a thermostat controlling said heating of said dwelling by the combustion of said liquid fuel; and E. displaying said signal at said thermostat effective to provide to a user observing the display a continuous display of the actual level of fuel in the tank.

17. The method of claim 16, further comprising modulating, encoding, or both modulating and encoding said signal prior to transmitting, and wherein said signal is demodulated, decoded, or both demodulated and decoded after being received.

18. The method of claim 16, further comprising providing a solar-powered source for powering said sensing, said transmitting, or both said sensing and said transmitting.

* * * * *